(12) United States Patent
Hardy (10) Patent No.: US 8,741,091 B2
(45) Date of Patent: Jun. 3, 2014

(54) METHOD FOR THERMOPLASTIC WELDING AND WELDED COMPOSITE STRUCTURES

(71) Applicant: Richard Hardy, Seattle, WA (US)

(72) Inventor: Richard Hardy, Seattle, WA (US)

(*) Notice: Subject to any disclaimer, the term of this patent is extended or adjusted under 35 U.S.C. 154(b) by 0 days.

(21) Appl. No.: 13/789,439

(22) Filed: Mar. 7, 2013

(65) Prior Publication Data

US 2013/0287481 A1 Oct. 31, 2013

Related U.S. Application Data

(60) Provisional application No. 61/638,959, filed on Apr. 26, 2012.

(51) Int. Cl.
*B29C 65/02* (2006.01)

(52) U.S. Cl.
USPC ..................................................... 156/272.2

(58) Field of Classification Search
USPC .......... 156/272.2, 272.4, 273.9, 274.2, 304.3, 156/304.6, 312
See application file for complete search history.

(56) References Cited

U.S. PATENT DOCUMENTS

| | | | |
|---|---|---|---|
| 3,062,940 A | 11/1962 | Hauer et al. | |
| 3,394,615 A | 7/1968 | Brueder | |
| 4,176,274 A | 11/1979 | Lippera | |
| 4,234,781 A | 11/1980 | Flink | |
| 4,455,482 A | 6/1984 | Grandclement | |
| 4,508,368 A | 4/1985 | Blumenkranz | |
| 4,673,450 A | 6/1987 | Burke | |
| 4,688,778 A | 8/1987 | Woltron | |
| 4,747,898 A | 5/1988 | Woltron | |
| 4,832,769 A * | 5/1989 | Shantz et al. ................. 156/73.5 |
| 4,851,647 A * | 7/1989 | Kuhling ......................... 219/535 |
| 4,871,412 A * | 10/1989 | Felix et al. .................. 156/273.9 |
| 5,225,025 A * | 7/1993 | Lambing et al. .............. 156/358 |
| 5,226,995 A | 7/1993 | White | |
| 5,407,520 A | 4/1995 | Butts | |

(Continued)

FOREIGN PATENT DOCUMENTS

| | | |
|---|---|---|
| CH | 658888 A5 | 12/1986 |
| DE | 3316211 A1 | 11/1984 |

(Continued)

OTHER PUBLICATIONS

Publication No. 09076350A, Patent Abstracts of Japan, PEEK Molding and Production Thereof, Yanagida Shinpei et al, Mar. 25, 1997.

(Continued)

*Primary Examiner* — Daniel McNally
(74) *Attorney, Agent, or Firm* — R. Reams Goodloe, Jr.

(57) ABSTRACT

A composite structure fabricated by thermoplastic welding, and a method for producing such structures. First and second composite parts are provided, having first and second surfaces, respectively, that define an interface where the parts are to be joined. The parts include a thermoplastic matrix. An insert is provided, which includes a film portion, which may include the same thermoplastic matrix. The insert is provided with an electric resistance heating element. The first and second parts are urged together using low fusion pressure while the insert is heated using the electric resistance heating element. After a selected period of time, the electrical supply to the resistance heating element is turned off. A high fusion pressure is then applied to urge the parts together. The weldment joint is allowed to cool. After cooling, excess material may be removed, to form a composite structure.

30 Claims, 5 Drawing Sheets

(56) References Cited

U.S. PATENT DOCUMENTS

| | | | |
|---|---|---|---|
| 5,410,131 | A | 4/1995 | Brunet et al. |
| 5,444,228 | A * | 8/1995 | Gelus ............................ 219/549 |
| 5,688,426 | A | 11/1997 | Kirkwood et al. |
| 5,882,756 | A | 3/1999 | Alston et al. |
| 5,968,442 | A | 10/1999 | Sato et al. |
| 6,436,507 | B1 * | 8/2002 | Pannell ......................... 428/102 |
| 6,524,425 | B1 | 2/2003 | Tobias et al. |
| 6,840,545 | B2 | 1/2005 | Schulte-Ladbeck et al. |
| 7,338,085 | B2 | 3/2008 | Toriyabe et al. |
| 7,503,992 | B2 * | 3/2009 | Knapp ............................ 156/82 |
| 2003/0075919 | A1 * | 4/2003 | Schulte-Ladbeck et al. 285/21.1 |
| 2007/0084552 | A1 * | 4/2007 | Watanabe et al. .......... 156/272.8 |
| 2008/0135529 | A1 | 6/2008 | Kuchuk-Yatsenko et al. |

FOREIGN PATENT DOCUMENTS

| | | |
|---|---|---|
| EP | 1201403 A2 | 5/2002 |
| FR | 1072800 | 3/1953 |
| FR | 2562613 A1 | 10/1985 |
| GB | 2447928 A | 10/2008 |
| SU | 1278245 A1 | 12/1986 |
| SU | 1484300 A3 | 5/1989 |
| WO | WO2013/163184 A1 | 10/2013 |

OTHER PUBLICATIONS

International Search Report dated Aug. 29, 2013 (PCT/US2013/037802—International Filing Date: Apr. 23, 2013).

* cited by examiner

METHOD FOR THERMOPLASTIC WELDING AND WELDED COMPOSITE STRUCTURES

RELATED PATENT APPLICATIONS

This application claims priority from prior U.S. Provisional Patent Application Ser. No. 61/638,959, filed Apr. 26, 2012, entitled METHOD FOR THERMOPLASTIC WELDING AND WELDED COMPOSITE STRUCTURES, the disclosure of which is incorporated herein in its entirety, including the specification, drawing, and claims, by this reference.

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to methods for fabrication of thermoplastic and/or composite materials, and to structures resulting from use of such methods.

BACKGROUND

Efforts to more economically provide lightweight, long life structures subject to stress and related fatigue, such as airframes for the assembly of aircraft, have resulted in increasing use of thermoplastic and/or related composite materials. The development of various composite materials, and methods of fabricating structures using such materials, has highlighted an as yet unmet need for a process that might be utilized to efficiently, effectively, and reliably join thermoplastic or composite materials together.

In general, design methods associated with prior art welding of various types of plastics have encountered various difficulties. Some methods previously suggested have had or would have difficulty, as a practical matter, in reliably joining components together. For example, the use of welding of thermoset type materials has not been widely utilized in structures that require reliable joint life.

As a consequence of difficulties with thermoset materials, interest has grown in the potential for use of thermoplastic materials in airframe construction, or for other aerostructures. A key issue, however, is how to provide strength, particularly in the "Z" direction, in a joint between two thermoplastic component parts. Thus, there remains a need for a method for fabrication of a composite structure that is capable of reliably joining thermoplastic material parts. Moreover, it would be advantageous to provide a method which facilitates the assembly of parts made from materials desirable for use in aerostructures, such as polyetheretherketone ("PEEK").

BRIEF DESCRIPTION OF THE DRAWING

The present invention will be described by way of exemplary embodiments, illustrated in the accompanying drawing figures in which like reference numerals denote like elements, and in which.

The foregoing figures, being merely exemplary, contain various elements that may be present or omitted from actual apparatus that may be constructed to practice the methods taught herein, and to manufacture the composite structures as set forth herein. An attempt has been made to draw the figures in a way that illustrates at least those elements that are significant for an understanding of the various methods taught herein for the manufacture of composite structures. However, various other elements for a method of manufacture of composite structures using thermoplastic welding using heated inserts may be utilized in order to provide composite structures.

DETAILED DESCRIPTION

Exemplary method(s) for the fabrication of composite structures is set forth herein. Composite structures made by such method(s) are also described herein. For purposes of this specification, unless expressly set forth otherwise, or unless another interpretation is required by the specific context mentioned, the various materials described in detail herein are provided for exemplary purposes only, and other composite structures may be constructed using plastic materials which may be heated to a glass transition temperature to provide for suitable amalgamation of a thermoplastic matrix in adjacent parts and in a film portion insert as described herein, using the method(s) provided herein.

Figure 1:
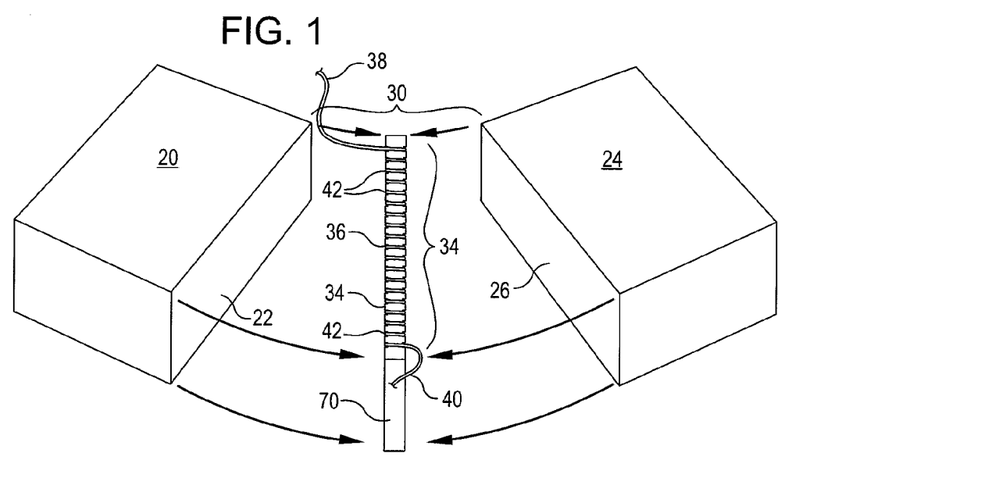
FIG. 1 provides a perspective view of a first part having a first surface and a second part having a second surface, where the first and second parts define an area to be welded to join the first part and the second part, and an insert as taught herein including a film portion and resistance heating elements, with arrows indicating that the first part and the second part are to be urged toward the insert for manufacture of a welded composite structure.

Attention is directed to FIG. 1, which provides a general overview of a method for manufacture of a composite structure. As shown in FIG. 1, a first composite part 20 having a first surface 22 is provided. A second composite part 24 having a second surface 26 is provided. In an embodiment, the first composite part 20 and the second composite part 24 have a common thermoplastic matrix component M (not shown). For example, both of the first composite part 20 and the second composite part 24 may be include a thermoplastic matrix component M that includes polyetheretherketone (PEEK). To join the first composite part 20 and the second composite part 24, the parts are juxtaposed so that the first surface 22 and the second surface 26 define a weldment area 30 therebetween (perhaps better appreciated in FIGS. 5 and 5A), at which the first composite part 20 and the second composite part 24 are to be joined. An insert 32 is provided. In an embodiment, the insert 32 includes (1) a film portion 34 that includes the common thermoplastic matrix component M that is found in first composite part 20, and in the second composite part 24. The insert 32 also includes an electrical resistance heating element 36.

Figure 4:
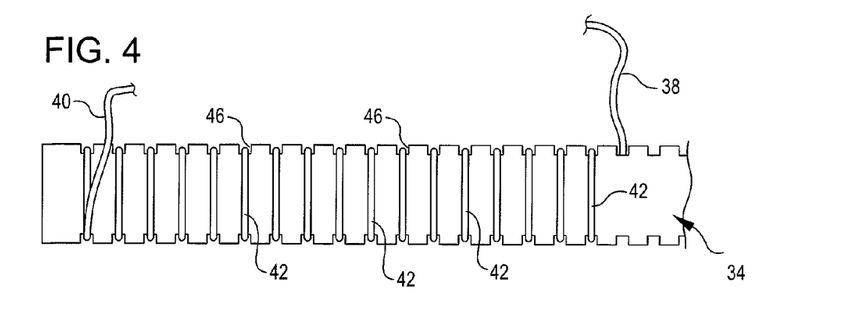
FIG. 4 provides a side view of an embodiment for an insert, showing a film portion with wires installed thereon to form a resistance heating element about the film portion.

As shown in FIG. 1, and better seen in FIG. 4, the electrical resistance heating element 36 may include a first end 38 and a second end 40, and a plurality of coils 42 about the film portion 34. To energize and heat the electrical resistance heating element 36, electric current is applied between the first end 38 and the second end 40, in a manner that will be understood to those of skill in the art and which need not be further described in detail. In general, electrical power is supplied between first end 38 and second end 40 as noted by power supply P in FIG. 5. Such power supply P may be portable in nature, and thus useful for making repairs such as patches in aerostructures (i.e., those structures manufactured for flight, or any units, components, or sections of aircraft or other vehicles capable of flight). The precise amount of electrical current required to generate an amount of heat for accomplishing the welding process may be determined by a practitioner without undue experimentation. The actual amount of electrical current, and the time which it is applied, will vary, depending upon the size of the first composite part 20 and the second composite part 24, as well as on the thickness T (see FIG. 2) of the film portion 34, and the material used for the electrical resistance heating element itself.

Figures 2, 3:
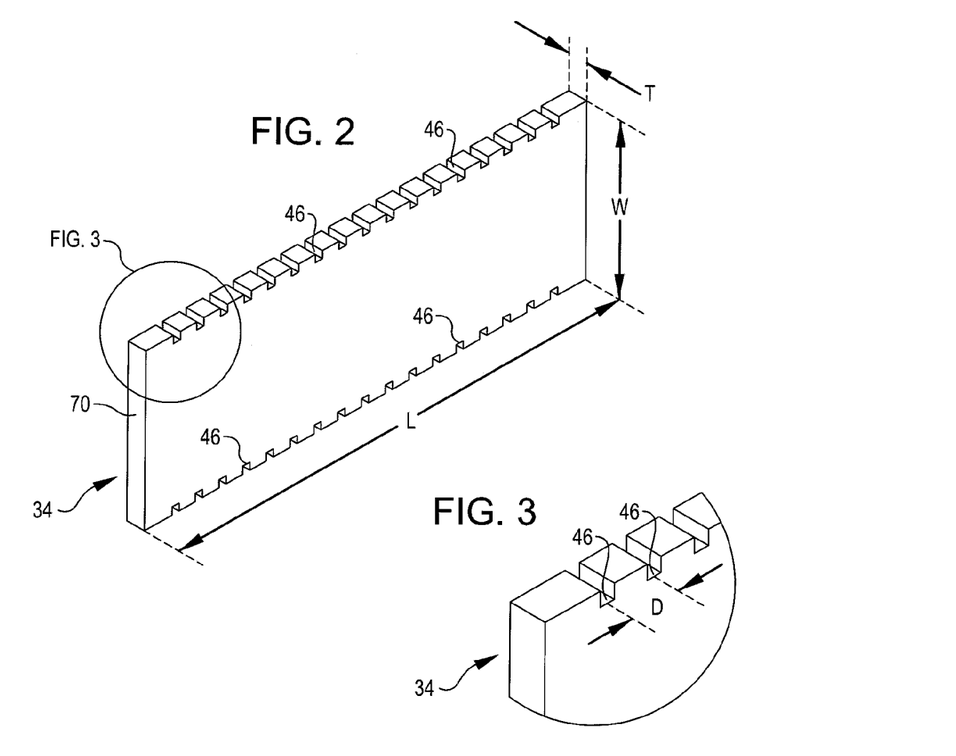
FIG. 2 provides a perspective view of an embodiment for a film portion of an insert, shown having a thickness T and a length L and width W, and in this embodiment, the film portion is further provided with a plurality of locating grooves along edge portions for spacing apart wires (not shown, FIG. 4) that are used in a resistance heating element.
FIG. 3 provides an enlargement of a portion of FIG. 2, now illustrating in greater detail an embodiment wherein the film portion further includes a plurality of grooves along edge portions, for location of wires that are used to form a resistance heating element.

As noted in FIGS. 2 and 3, in an embodiment, the film portion 34 may be provided with a plurality of notches 46, for location therein of a coil winding of coils 42 of the electrical resistance heating element 36. The notches may be spaced apart a suitable distance D. As shown in FIG. 3, in an embodiment, notches 46 may be spaced apart a centerline distance D of about zero point one (0.1) inches. However, such spacing may be varied as may be necessary or desirable to achieve the results taught according to the methods described herein. In various embodiments, the electrical resistance heating element 36 may be provided in the form of a wire. In various embodiments, the electrical resistance heating element 36 may be provided in a brass material. In various embodiments, an electrical resistance heating element 36 of brass wire of about eight mils (0.008 inches) in diameter may be wrapped around the film portion 34. In an embodiment, an electrical resistance heating element 36 of brass wire may be located within notches 46.

Figure 5:
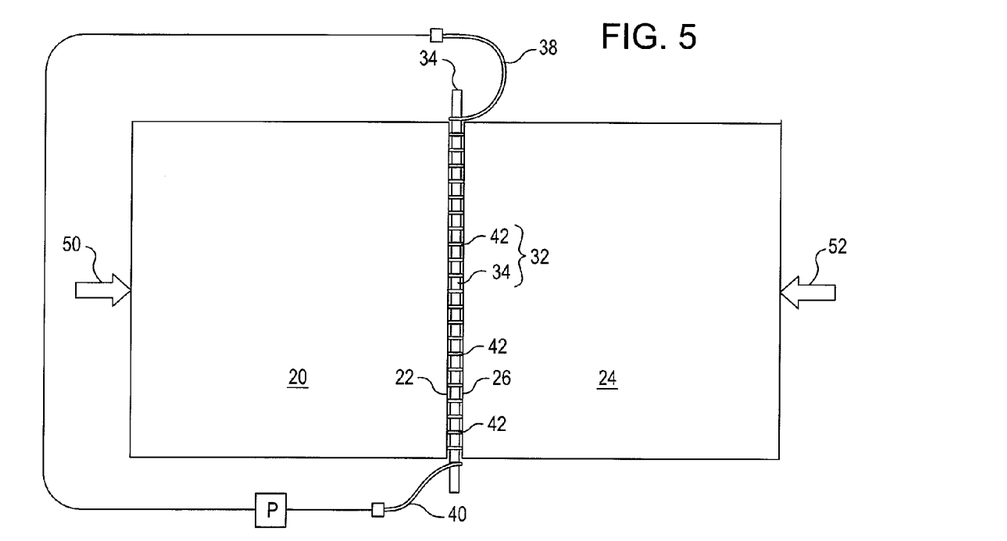
FIG. 5 provides a conceptual plan view of the formation of a welded composite structure by urging a first part and a second part together along a weld area, while heating an insert in the weld area via electrical resistance heating elements provided in or around the film portion of the insert.
Figure 5A:
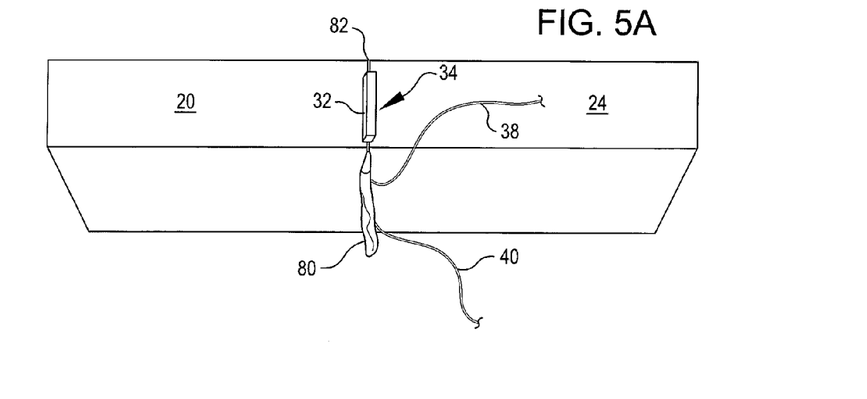
FIG. 5A provides a perspective illustration of a welded composite structure which has been joined according to the method just illustrated in FIG. 5, showing a weld joint along which residual material emerges, as well as remnants of a film portion protruding between first and second composite parts.

Attention is directed to FIGS. 5, and 5A, wherein the insert 32, including film portion 34 and coils 42 of the electrical resistance heating element 36, is placed between a first surface 22 and a second surface 26. A selected electric current is applied through an electrical resistance heating element 36 for a selected time, to heat the film portion 34 to at least a glass transition temperature. During heating, the electrical current is applied to heat the film portion 34 and also to heat a portion of the thermoplastic matrix M at or adjacent a first surface 22 and a second surface 26 in the first composite part 20 and in the second composite part 24, respectively. In an embodiment, a current of about three (3) amps may be applied for about one minute to an electrical resistance heating element 36, to preheat the film portion 34, before initiation of the application of pressure between the first composite part 20 and the second composite part 24. After such preheating cycle is completed, then the electrical current may be pulsed on and off for the next two minutes. In an embodiment, the current may be applied at about six point five (6.5) amps, when using the specified wire, namely an eight (8) mil wire. In an embodiment, it has been found that a selected time schedule of about fifteen seconds on, followed by five seconds off, provides adequate heating. The pulsing of the electrical current to the electrical resistance heating element allows maintenance of heating, thus allowing heat to permeate the entire weldment area, yet prevents overheating, or burning of the materials involved. During at least a portion of the selected time, pressure is applied as indicated by reference arrows 50 and 52 in FIG. 5, to the first composite part 20 and to the second composite part 24, respectively, to urge the first surface 22 toward the second surface 26. During heating, a low fusion pressure of about one pound per square inch may be adequate to press the first composite part 20 and the second composite part 24 together. With adequate heating of the film portion 34, the first surface 22, and the second surface 26, the thermoplastic matrix M in the said film portion 34 bonds with the thermoplastic matrix M at the first surface 22 and at the second surface 26, to form a composite structure, such as composite structure 60 seen in FIG. 6, or composite structure 62 seen in FIG. 7. During heating and forming of a welded composite structure, the film portion 34 and the thermoplastic matrix M in or adjacent first surface 22 in a first composite part 20 and in or adjacent second surface 26 in a second composite part 24 should be melted without softening and distorting most of the thermoplastic material of the first composite part 20 and of the second composite part 24. Consequently, a careful evaluation and selection of applicable electrical current to be applied, and of the selected time for which it is to be applied, may be made as appropriate in particular circumstances. When the welded composite structure 60 or 62 has been formed by application of pressure and heat, the electrical current applied to the electrical resistance heating element 36 is terminated. Then, the welded composite structures 60 and 62, i.e. the parts being welded together, are pressed together using a high fusion pressure, in the manner indicated by reference arrows 50 and 53 in FIG. 5, which may, in an embodiment be with a force that produces approximately one hundred pounds per square inch between the parts, i.e. at the weldment joint 82 as noted in FIG. 5A or FIG. 6. The entire structure (60, 62) is then allowed to cool. The high applied pressure causes at least a portion, if not most, of the melted film portion 34 to be squeezed out of the weldment joint 82, leaving Z-pining fibers (further discussed below) embedded between the first composite part 20 and the second composite part 24. Since a portion of the first composite part 20 and of the second composite part 24 may be affected by the welding procedure, such parts may be designed by providing extra material adjacent a first surface 22 and adjacent a second surface 26, which extra material is not needed for the structural integrity of the finished composite structure 60 or 62.

Figure 8:
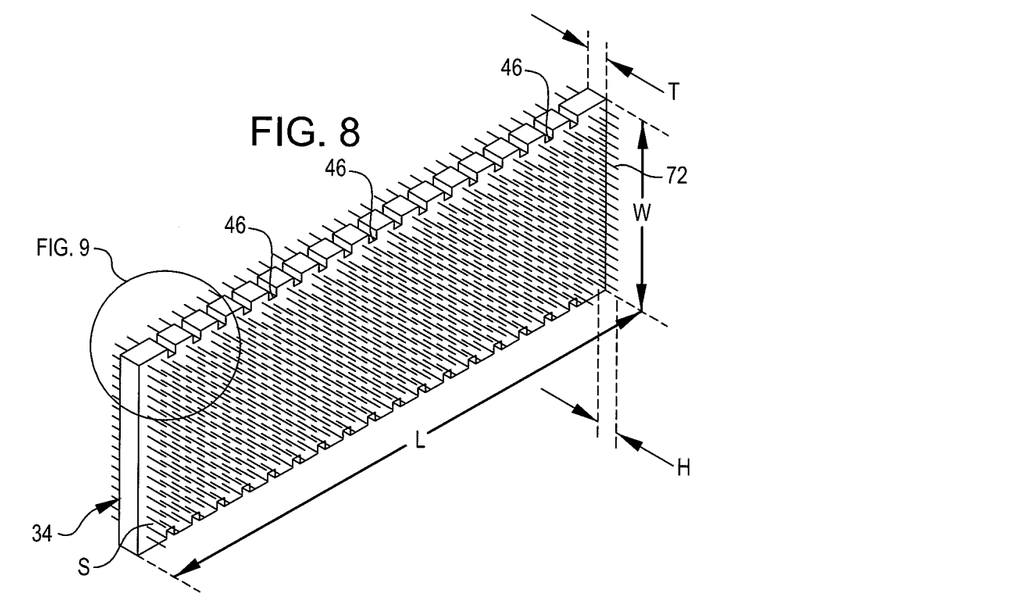
FIG. 8 is a diagrammatic illustration of an embodiment wherein the film portion further comprises Z-pins; such Z-pins assist in formation of a strong bond between the first composite part and the second composite part when welded together using a film portion in the manner described herein.
Figure 9:
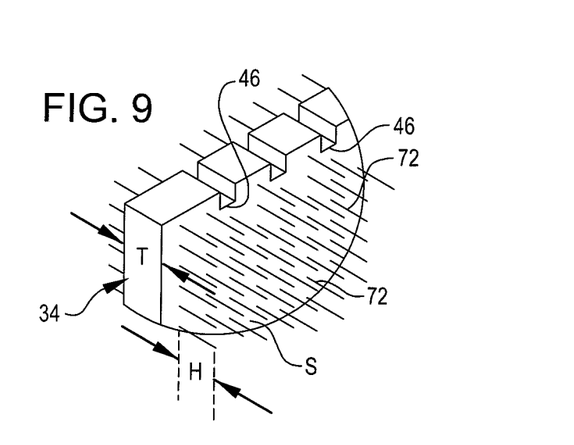
FIG. 9 is an enlarged portion of FIG. 8, showing in more detail wherein Z-pins extend outward for a height H above a surface face of a film portion.

In various embodiments of the method, and of a composite structure made by the method the film portion 34 may further include strengthening fibers. In an embodiment, carbon fibers within the film portion 34 may be utilized. In an embodiment the strengthening fibers may include Z-pins. In an embodiment, Z-pins 70 may be provided within the structure of film portion 34. In an embodiment as indicated in FIGS. 8 and 9, external Z-pins 72 may be provided. Such external Z-pins 72 may be provided in a height H above a surface S of film portion 34. In various embodiments, the Z-pins may be provided at a selected areal density. In various embodiments, the Z-pins may be provided in a material of a type contained in the first composite part. In various embodiments, the Z-pins may be provided in a material of a type contained in the second composite part. In an embodiment, the Z-pins may be provided in carbon fiber.

Generally, Z-pinning is the reinforcement of a composite structure in the "Z" direction, using fiber, metal, or other materials for pins that are disposed in the Z direction (wherein the Z-direction is usually defined as along an axis orthogonal to the plane of a joint between parts). The Z-pins used may be provided in a selected array pattern, and in a selected areal density. Composite fabrication using Z-pinning has been described in various patents, such as U.S. Pat. No. 5,882,756, issued Mar. 16, 1999 to Alston et al., and entitled Composite Patches Having Z-Pin Reinforcement, and U.S. Pat. No. 6,436,507 B1, issued Aug. 20, 2002 to Pannell, and entitled Composites Joined with Z-Pin Reinforcement (e.g., see Z-pins 130 in various figures), the disclosures of each of just mentioned U.S. Patents are included herein in their entirety by this reference.

Figure 6:
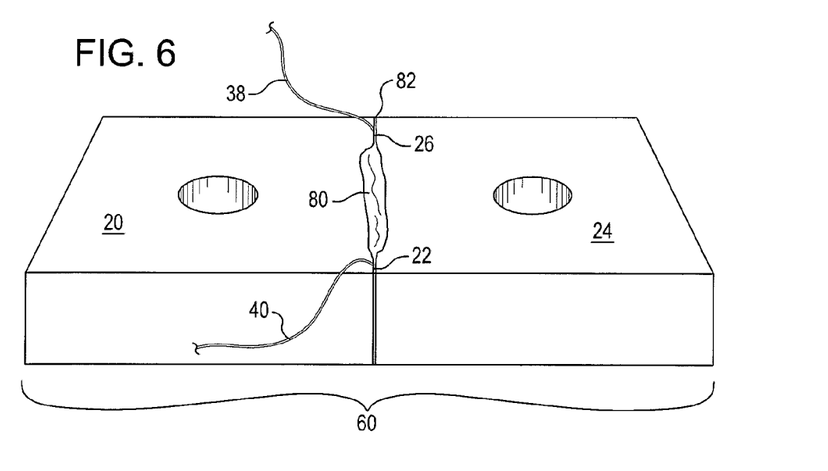
FIG. 6 is a perspective view which illustrates a welded composite structure, showing a weld joint along which residual material has emerged as a result of heating of the film portion and application of pressure between the first part and the second part, and also showing a first wire lead and a second wire lead that are provided to energize the electrical resistance heating element.

Attention is now directed to FIG. 6, wherein in may be seen that the application of pressure to urge a first composite part 20 and a second composite part 24 together may result in emergence of residual material 80 along a weldment joint 82 between the first surface 22 and the second surface 26. As can be seen by comparison between FIGS. 6 and 7, in an embodiment, the method may further include removal of the residual material 80 from the composite structure 60, so that a finished composite structure 62 is provided. Removal of residual material 80 may involve removal of a portion of thermoplastic matrix M that originated from the film portion 34. Also, in FIG. 7, it may be noted that in an embodiment, electrical resistance heating elements may be formed by embodiment of wire in the film portion 34, and as such, segment ends 84 of heating elements may be seen. In either case, whether the electrical heating element 36 is provided in the manner noted in FIG. 4, or in the manner noted as heating element 36' in FIG. 7, removal of excess residual material 80 may involve removal of a portion of the heating element.

In general, the film portion 34 may be provided in a shape and size (e.g., length L and width W as noted in FIG. 2) at least as large as the weldment area defined between the first surface 22 and the second surface 26. In an embodiment, the film portion 34 may be provided in a shape and size conforming to the weldment area defined between the first surface 22 and the second surface 26. In various embodiments, the film portion 34 may be provided in a selected thickness T. In an embodiment, the film portion 34 may be provided in a thickness T of about zero point zero three zero inches (0.030 inches). In various embodiments, uniformity of thickness of film portion T, as used in a particular weld operation, results in better weld performance. In some embodiments, the variation V in thickness T should not vary anywhere in the film portion 34, by more than about two thousandths of an inch (0.002 inches). For example, in an embodiment, when a thickness T of thirty thousandths of an inch (0.030 inches) is used, then the thickness T should not be less than twenty eight thousandths of an inch (0.028 inches) or more than thirty two thousandths of an inch (0.032 inches).

Figure 7:
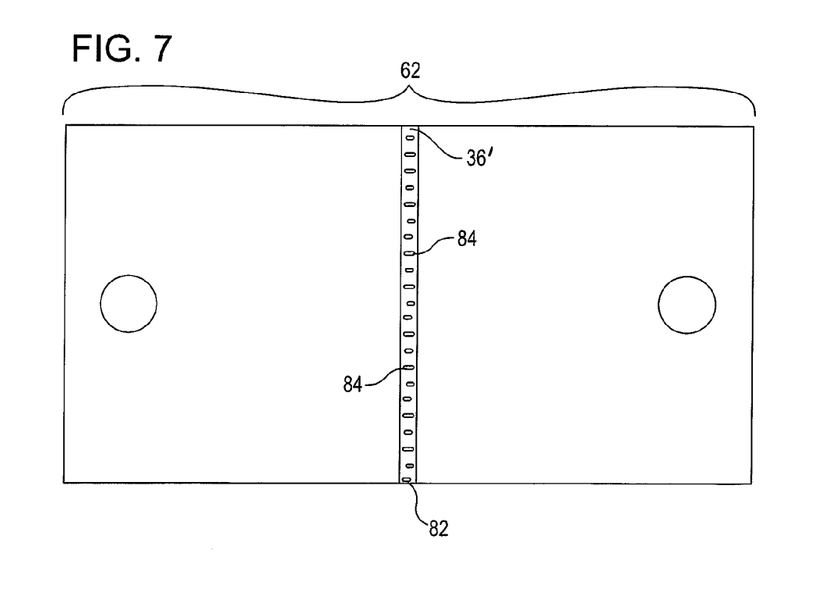
FIG. 7 is an plan view of an embodiment for a composite structure that has been welded together, and in which an electrical resistance heating element has been embedded in the film portion, and in which the resultant composite structure has been further worked to remove the residual material protruding from a weld joint between the first composite part and the second composite part.
Figure 10:
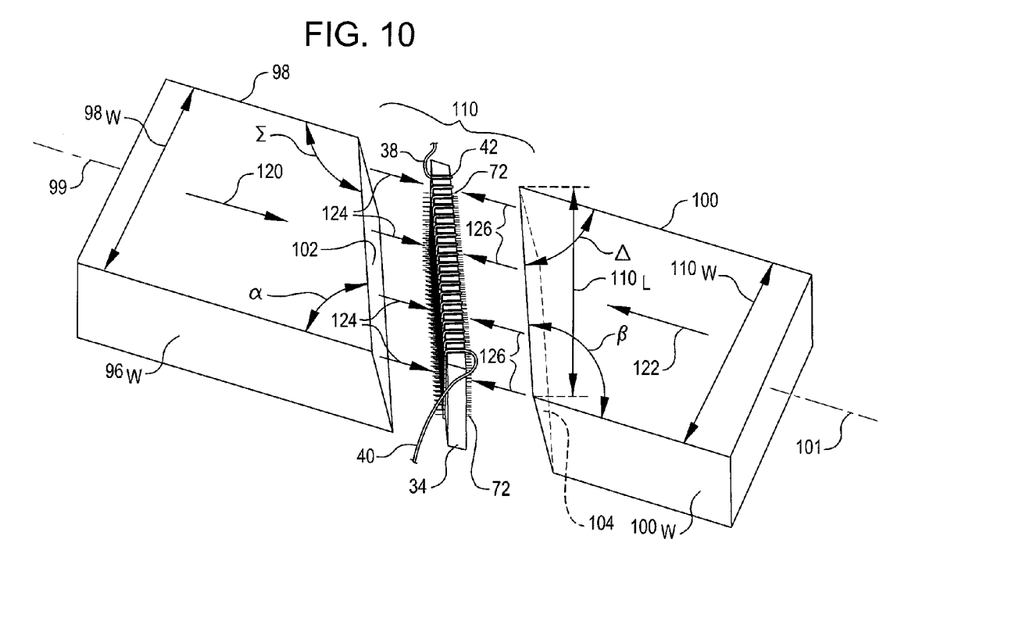
FIG. 10 is a diagrammatic illustration of an embodiment wherein a weldment is made along an angled cut portion between two composite elements to be joined, rather than along a straight cut portion between two composite elements to be joined, in order to increase the surface area between the two composite portions to be joined, and still using a film portion that includes Z-pins to assist in formation of a strong bond between the first composite part and the second composite part when welded together using a film portion in the manner described herein.

Attention is now directed to FIG. 10, which provides a diagrammatic illustration of a first part 98, and a second part 100, which are to be joined. In an embodiment, a weldment may be made along a first surface 102 is set out in a first part 98 at an angle alpha ($\alpha$) (as compared to the longitudinal centerline 99 of first part 98, which is shown here parallel to edgewall $98_W$) wherein the angle ($\alpha$) is not ninety degrees (90°) but at an acute angle, i.e. less than ninety degrees (90°). In such an embodiment, the length of a welded joint 110 between first part 98 and second part 100 is of length $110_L$, which is longer than the width $98_W$ of a first part 98 or width $100_W$ of a second part 100. A second surface 104 may be provided in a second part 100, at a complementary angle beta ($\beta$) that is larger than ninety degrees (90°) as compared to the longitudinal centerline 101 of second part 100, which as shown is parallel to edgewall $100_W$. In an embodiment, as illustrated in FIG. 10, corresponding angles delta ($\Delta$) and sigma ($\Sigma$), respectively, may thus complete setting out an angled cut portion between the first and second composite parts 98 and 100 to be joined. This method provides increased surface area along an angled joint 110, as compared to a joint that might be made at a straight cut at a right angle as illustrated in FIGS. 6 and 7, for example. This increase in surface area of angled joint 110 between the first and second composite parts 98 and 100, still uses a film portion 34 as described above, and may include Z-pins 72 to assist in formation of a strong bond between the first composite part 98 and the second composite part 100 when welded together in the manner described herein. Similar to the reference arrows 50 and 52 noted in FIG. 5 above, the first part 98 and second part 100 may be urged together in the directions noted by reference arrows 120 and 122. Alternately, depending on the Z-pin orientation, a slightly different angle for pressure may be selected, but in any event, first part 98 is pressed toward film portion 34 (very generally in a selected direction as indicated by reference arrows 124) and second part 100 is pressed toward film portion 34 (very generally in a selected direction as indicated by reference arrows 126). More generally, it should be understood that the method(s) described herein may be utilized for various weld shapes or types, including sheer welds, butt welds, or angle welds.

The method(s) described herein may be used for fabrication of a variety of thermoplastic matrix containing materials, to produce composite structures. Further, the method(s) described herein may be utilized to fabricate a patched composite structure, component, or part. The method(s) may be used with a variety of thermoplastic composites. Further, the method(s) are compatible with the use of carbon fibers in composite structures. The method(s) may be advantageously utilized with composite parts that include polyetheretherketone ("PEEK"), which is a linear aromatic polymer that is semi-crystalline, and widely regarded as a high performance thermoplastic material. PEEK polymers include repeating monomers of two ether groups and a ketone group. PEEK is particularly advantageous for use in aerostructures, since it is lightweight, is resistant to fluids such as hydraulic fluids, and has good heat and abrasion resistance. Thus, in an embodiment, a composite structure, such as composite structure 60 or 62, may be manufactured using polyetheretherketone. Consequently, in an embodiment, the first composite part may be polyetheretherketone. In an embodiment, the second composite part may be polyetheretherketone. In an embodiment, the film portion 34 may be provided in polyetheretherketone. More generally, composite structures provided by the method(s) set forth herein may be composed of a thermoplastic. Further, the method(s) described herein may be useful for providing a patch in a composite structure.

As an example, after extensive experimentation using PEEK with chopped carbon fiber placed in a random direction, it was discovered that the use of a three hundredths of an inch (0.030 inches) thick film portion 34, wherein the with variation in thickness T was less than two thousandths of an inch (0.002 inches), when using an eight (8) mil diameter wire with the amperage and pressure profile indicated above, reliably produced a good weld, time after time. Blocks of PEEK chopped carbon fiber composite and PEEK composite film portions that were two (2) inches wide by one-half inch (0.5 inch) high (in cross-section), were welded as taught herein. The finished structure, after welding, was tested in tension. The specified tensile strength of unreinforced PEEK is five thousand (5,000) pounds per square inch (psi). The specified tensile strength of the chopped carbon fiber PEEK used for testing was nineteen thousand (19,000) pounds per square inch (psi). A tensile test of an unwelded composite PEEK specimen verified the nineteen thousand (19,000) pounds per square inch (psi) strength. The welding and testing of eight PEEK specimens in a proof-of-concept experiment produced a good weld every time. The finished welded product had a tensile strength of one hundred twenty percent (120%) to one hundred thirty percent (130%) of unreinforced PEEK tensile strength. Those tests indicate that not only was the welded PEEK matrix material continuous and undamaged but that at least some of the chopped carbon fibers had crossed the weld boundary in the "Z" direction, and thus were acting as Z-pins.

In the foregoing description, numerous details have been set forth in order to provide a thorough understanding of the disclosed exemplary embodiments for welding thermoplastic materials together to form a composite structure. However, certain of the described details may not be required in order to provide useful embodiments, or to practice selected or other disclosed embodiments. Further, the description may include, for descriptive purposes, various relative terms such as surface, adjacent, proximity, near, on, onto, and the like. Such usage should not be construed as limiting. Terms that are relative only to a point of reference are not meant to be interpreted as absolute limitations, but are instead included in the foregoing description to facilitate understanding of the various aspects of the disclosed embodiments. Various operations in the method(s) described herein may have been described as multiple discrete operations, in turn, in a manner that is most helpful in understanding the method(s). However, the order of description should not be construed as to imply that such operations are necessarily order dependent, or that it is imperative to fully complete one step before starting another, for example, the precise timing of cessation of heating and the start of application of high fusion pressure, may overlap. Further, certain operations may not need to be performed in the order of presentation. And, in different embodiments, one or more operations may be performed simultaneously, or eliminated in part or in whole while other operations may be added. Also, the reader will note that the phrase "in one embodiment" has been used repeatedly. This phrase generally does not refer to the same embodiment; however, it may. Finally, the terms "comprising", "having" and "including" should be considered synonymous, unless the context dictates otherwise.

Various aspects and embodiments described and claimed herein may be modified from those shown without materially departing from the novel teachings and advantages provided by this invention, and may be embodied in other specific forms without departing from the spirit or essential characteristics thereof. Embodiments presented herein are to be considered in all respects as illustrative and not restrictive or limiting. This disclosure is intended to cover methods and apparatus described herein, and not only structural equivalents thereof, but also equivalent structures. Modifications and variations are possible in light of the above teachings. Therefore, the protection afforded to the developments described herein should be limited only by the claims set forth herein, and the legal equivalents thereof.

The invention claimed is:

1. A method for fabrication of a composite structure, comprising:
   (a) providing a first composite part having a first surface and a second composite part having a second surface, said first composite part and said second composite part having a common thermoplastic matrix component;
   (b) juxtaposing the first surface and the second surface to define a weldment area therebetween, at which the first composite part and the second composite part are to be joined;
   (c) providing an insert, the insert comprising (1) a film portion having a thickness T of about zero point zero three zero (0.030) inches, said film portion comprising said common thermoplastic matrix component, and (2) a resistance heating element;
   (d) placing the insert between the first surface and the second surface;
   (e) applying a selected electric current for a first selected time to said resistance heating element, to preheat said insert to at least a glass transition temperature, and then applying a selected electric current in a pulsating on-off manner to said resistance heating element, to further heat said insert and said first surface and said second surface;
   (f) during at least a portion of said selected time, applying a low fusion pressure to the first composite part and the second composite part to urge said first surface toward said second surface, and wherein said thermoplastic matrix in said film portion bonds with a thermoplastic matrix in or adjacent said first surface and in or adjacent said second surface to form said composite structure;
   (g) terminating application of said electric current;
   (h) applying a high fusion pressure between the first composite part and the second composite part while allowing the composite structure to cool.

2. The method as set forth in claim 1, wherein applying a selected electric current in a pulsating on-off manner to said resistance heating element comprises a pulse-on cycle and a pulse-off cycle, wherein the time for said pulse-on cycle is longer than the time of said pulse-off cycle.

3. The method as set forth in claim 2, wherein applying a selected electric current in a pulsating on-off manner to said resistance heating element is conducted over a time of about two minutes.

4. The method as set forth in claim 3, wherein said pulse-off cycle time is about five seconds.

5. The method as set forth in claim 2, wherein said pulse-on cycle time is about fifteen seconds.

6. The method as set forth in claim 1, wherein said insert further comprises Z-pins.

7. The method as set forth in claim 6, wherein said Z-pins comprise carbon fiber.

8. The method as set forth in claim 1, wherein said low fusion pressure between the first composite part and the second composite part is about one pound per square inch.

9. The method as set forth in claim 1, wherein said high fusion pressure between the first composite part and the second composite part is about one hundred pounds per square inch.

10. The method as set forth in claim 1, wherein said first composite part comprises extra material adjacent said first surface, said extra material comprising material not needed for structural integrity of said finished composite structure.

11. The method as set forth in claim 1, wherein said second composite part comprises extra material adjacent said second surface, said extra material comprising material not needed for structural integrity of said finished composite structure.

12. The method as set forth in claim 1, wherein applying said high fusion pressure to urge the first composite part and the second composite part together results in emergence of residual material along a joint between the first surface and the second surface, and where the method further comprises removal of the residual material from the composite structure.

13. The method as set forth in claim 1, wherein the film portion is provided in a shape and size at least as large as said weldment area.

14. The method as set forth in claim 1, wherein the film portion is provided in a shape and size conforming to said weldment area.

15. The method as set forth in claim 1, wherein the film portion has a variation V in the thickness T of about two thousandths of an inch (0.002 inches), or less.

16. The method as set forth in claim 1, wherein the resistance heating element is wrapped around the film portion.

17. The method as set forth in claim 1, wherein the resistance heating element is embedded in the film portion.

18. The method as set forth in claim 1, wherein the resistance heating element comprises a wire.

19. The method as set forth in claim 1, wherein the first composite part comprises polyetheretherketone.

20. The method as set forth in claim 1, wherein the film portion comprises polyetheretherketone.

21. The method as set forth in claim 1, wherein method comprises application of a patch to a composite structure.

22. The method as set forth in claim 1, wherein said first surface is set out in said first part at an angle alpha ($\alpha$), wherein the angle alpha ($\alpha$) is not ninety degrees (90°) as compared to a longitudinal axis of the first part, and wherein said second surface is set out in said second part at an angle beta ($\beta$), wherein the angle beta ($\beta$) is not ninety degrees (90°) as compared to a longitudinal axis of the second part, thereby providing an angled joint between said first part and said second part.

23. A method for fabrication of a composite structure, comprising:
    (a) providing a first composite part having a first surface and a second composite part having a second surface, said first composite part and said second composite part having a common thermoplastic matrix component, said common thermoplastic matrix component comprising polyetheretherketone;
    (b) juxtaposing the first surface and the second surface to define a weldment area therebetween, at which the first composite part and the second composite part are to be joined;
    (c) providing an insert, the insert comprising (1) a film portion having a thickness T of about zero point zero three zero (0.030) inches, said film portion comprising polyetheretherketone, and (2) a resistance heating element;
    (d) placing the insert between the first surface and the second surface;
    (e) applying a selected electric current for a first selected time to said resistance heating element, to preheat said insert to at least a glass transition temperature, and then applying a selected electric current in a pulsating on-off manner to said resistance heating element, to further heat said insert and said first surface and said second surface;
    (f) during at least a portion of said selected time, applying a low fusion pressure to the first composite part and the second composite part to urge said first surface toward said second surface, and wherein said thermoplastic matrix in said film portion bonds with a thermoplastic matrix in or adjacent said first surface and in or adjacent said second surface to form said composite structure;
    (g) terminating application of said electric current;
    (h) applying a high fusion pressure between the first composite part and the second composite part while allowing the composite structure to cool.

24. The method as set forth in claim 23, wherein applying a selected electric current in a pulsating on-off manner to said resistance heating element comprises a pulse-on cycle and a pulse-off cycle, wherein the time for said pulse-on cycle is longer than the time of said pulse-off cycle.

25. The method as set forth in claim 24, wherein applying a selected electric current in a pulsating on-off manner to said resistance heating element is conducted over a time of about two minutes.

26. The method as set forth in claim 24, wherein said pulse-on cycle time is about fifteen seconds.

27. The method as set forth in claim 24, wherein said pulse-off cycle time is about five seconds.

28. The method as set forth in claim 23, wherein said low fusion pressure between the first composite part and the second composite part is about one pound per square inch.

29. The method as set forth in claim 23, wherein said high fusion pressure between the first composite part and the second composite part is about one hundred pounds per square inch.

30. The method as set forth in claim 23, wherein said first composite part comprises extra material adjacent said first surface, and said second composite part comprises extra material adjacent said second surface, said extra material comprising material not needed for structural integrity of said finished composite structure.

* * * * *

UNITED STATES PATENT AND TRADEMARK OFFICE
CERTIFICATE OF CORRECTION

| | |
|---|---|
| PATENT NO. | : 8,741,091 B2 |
| APPLICATION NO. | : 13/789439 |
| DATED | : June 3, 2014 |
| INVENTOR(S) | : Hardy |

It is certified that error appears in the above-identified patent and that said Letters Patent is hereby corrected as shown below:

IN THE SPECIFICATION:

Column 3, line 33, after the word "may", delete "be".

Column 5, line 7, after the words "in an", delete "embodiment" and substitute therefore --embodiment,--.

Column 5, line 53, after the word "wherein", delete "in" and substitute therefore --it--.

Column 6, line 28, after the words "surface 102", delete "is" and substitute therefore --as--.

Signed and Sealed this
First Day of September, 2015

Michelle K. Lee
*Director of the United States Patent and Trademark Office*